Sept. 29, 1970   H. G. ZIMMERMANN   3,530,707
ANALYTICAL INSTRUMENT
Filed Aug. 1, 1966

INVENTOR.
Hans George Zimmerman
BY
Frank J. Thompson
ATTORNEY.

United States Patent Office 3,530,707
Patented Sept. 29, 1970

3,530,707
ANALYTICAL INSTRUMENT
Hans G. Zimmermann, Hodingen, Kreis Uberlingen, Germany, assignor to Bodenseewerk Perkin-Elmer & Co., G.m.b.H., Uberlingen (Bodensee), Germany, a corporation of Germany
Filed Aug. 1, 1966, Ser. No. 569,416
Claims priority, application Germany, Aug. 2, 1965, B 83,099
Int. Cl. B01d 53/04, 53/14; G01n 31/08
U.S. Cl. 73—23.1                     4 Claims

ABSTRACT OF THE DISCLOSURE

An analytical instrument is described in which a sample to be analyzed is conveyed to a detection means through a passage including a plurality of members wherein a surface of at least one of the members is formed of zirconium oxide.

---

This invention relates to analytical instruments of the type wherein a relatively small sample being analyzed is flowed to a detector. The invention relates more particularly to a means for increasing the accuracy of such an instrument by reducing undesired reactions between the sample and the material from which the apparatus is fabricated.

In an analytical instrument such as an elution chromatograph or mass spectrometer, a relatively small fluid sample flows over a predetermined path to a detection means for a quantitative or qualitative determination. It is often the case that the members forming the flow path are not wholly inert with respect to the many and various sample substances which are likely to be analyzed by the instrument. An undesirable reaction occurs between the materials of the flow path members and the sample or other substances of the instrument. This reaction reduces the accuracy of the instrument.

In particular, in an elution chromatograph, a sample being analyzed is transported by a carrier fluid to a separating column member containing a stationary phase. The sample and carrier fluid comprise a mobile phase while the stationary phase includes a sample component separating substance. The sample components exhibit differing affinities for the separating medium and their elution from the column occurs successively in time in accordance with their individual affinities. A separation of sample components is thereby effected.

In order to provide an accurate separation and indication of the relative quantities of components forming the sample, it is necessary that the members of the instrument remain essentially inert with respect to the substances forming the moving and stationary phases. In particular, those members defining a flow path for the sample and which should exhibit substantially inert characteristics include the column, sample injector block, detector, and the various fittings and tubulations interconnecting these members. The need for an inert member is particularly desirable in gas chromatography wherein the sample is vaporized and transported by a carrier gas to the column. The vaporized sample quantities are quite small and become considerably diluted upon pickup by the carrier gas. Any reaction with members of the apparatus can undesirably interfere with the elution characteristics and render areas under detected peaks inaccurate. The material from which the chromatograph members are formed should therefore be substantially inert.

Prior chromatographic instruments have exhibited certain undesirable reactions between the mobile phase and the walls of the separating column and other members of the apparatus defining a flow path for the sample. This is true particularly when the members are formed of metals. The more important examples of such undesirable effects are decomposition, and, isomerization and synthesis. These are reactions which, particularly in trace analysis, impair the results of the analysis, or, in a preparative operation impair the extraction of pure substances or possibly at times render such extraction impossible.

Various attempts have been made heretofore to avoid or reduce these undesirable characteristics. Chromatographic apparatus components have been formed of materials believed to be substantially inert. In this regard, the materials must remain inert with respect to a large number of substances which are to be analyzed by the apparatus. In particular, the separating columns of the apparatus have been formed of glass. This often ameliorated the problem. However, such apparatus is disadvantageous because of fragility. In addition, apparatus formed of glass has not always acted as an inert substance in view of the alkali ions in the glass. Further, the glass apparatus has undesirably exhibited relatively poor thermal properties.

Accordingly, it is an object of the present invention to provide in an analytical instrument wherein a sample is flowed to a detector means, an improved means for reducing inaccuracy in the detection resulting from reactions with members of the instrument.

Another object of the invention is to provide an improved elution chromatographic instrument in which members thereof defining a flow path for the sample are formed of a material which is relatively inert with respect to a relatively large number of substances.

A further object of the invention is to provide an elution chromatographic instrument wherein members defining a flow path for the sample exhibit the favorable mechanical and thermal characteristics of a metal and the relatively inert characteristics of a highly pure, electrically nonconductive ceramic material.

In accordance with a feature of the invention, the surface of members of the instrument defining a flow path for the sample are formed of an oxide including zirconium.

These and other objects of the invention will become apparent with reference to the following specification and drawings wherein.

Figure 1:
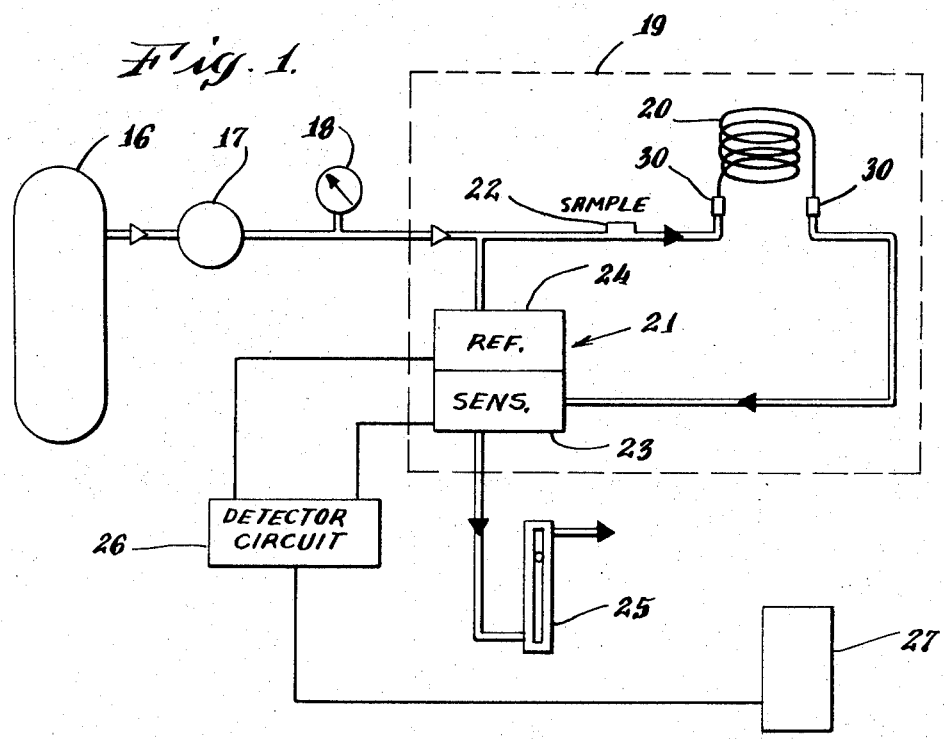
FIG. 1 is a diagram illustrating the general arrangement of a gas chromatographic instrument.

Referring now to FIG. 1, the general arrangement of a gas chromatographic instrument is shown and includes a source of carrier fluid 16 which may be a gas such as helium under pressure and which is connected through a suitable gas regulator means 17 to the input side of the system. A pressure gauge 18 is connected in series in the carrier gas line for indicating gas pressure. A major portion of the flow path for the carrier gas in enclosed within a temperature control chamber, indicated within the dotted lines in FIG. 1 as 19 and which may be of the thermostatic air-bath type. The carrier gas flows in series through a flow path defined by the various tubulation members, a sample injection block member 22, a separating column member 20, and a sensing portion 23 of a detector member which is indicated generally as 21. The gas, upon passing the pressure gauge 18 flows to a reference section 24 of the detector block 21.

In a particular apparatus, the detector is of the thermal conductivity type and the sensing section 23 indicates thermal conductivity changes of the carrier gas resulting from the presence of concentrates of the sample as they elute from the column 20. The reference section 24 of the detector block supplies a reference signal. Since the reference section 24 is connected to respond to the carrier gas input, it is capable of providing a reliable reference which will vary in accordance with the carrier gas input to the system.

The sample injection block 22 may be of the type described in U.S. Pat. 2,757,541. The sample which is undergoing analysis is injected into the moving stream of the carrier gas at this point and moves into and through the column 20. Column 20 is schematically represented as a helically shaped tubulation for the purpose of convenience and clarity. The column 20 may, of course, take numerous other configurations and still efficiently perform the function of separating the sample into a number of components which emerge from the column 20 at different times in accordance with their respective physical affinities for the separating medium of a stationary phase located in the column.

The separated sample components emerging from the column 20 are carried by the carrier gas through the sensing side 23 of the detector 21 where their relative quantities are indicated by thermal conductivity measurements. From the sensing side 23 of the thermal conductivity detector 21, the sample components are passed through a flow meter 25 and may be either disposed of as waste or accumulated in an appropriate collective system for further analysis of the vapor such as by a mass spectrometer.

The reference side 24 and the sensing side 23 of the detector are connected to an appropriate electrical circuit 26 which may comprise a balanced bridge of the Wheatstone type. The electrical output signal of the bridge circuit is proportional to the excess in thermal conductivity of the vapor passing through the sensing side 23 with respect to the thermal conductivity of the carrier gas and is therefore indicative of the quantity of separated components of the sample as they emerge from the vapor fractometer column 20. The electrical output signal of the detector circuit 26 may be fed to a high speed pen recorder indicated as 27.

In accordance with a feature of the present invention, the surfaces of one or more members of the chromatographic system of FIG. 1 defining a flow path for the sample of the components are formed of an oxide including zirconium. These members include the injector block and valve 22, the separating column 20, the fittings 23, the detector block 22 and the various tubulations interconnecting these members in the flow path. Such an arrangement is particularly advantageous since zirconium is resistant to alkalis and acids but is considerably less expensive than materials exhibiting similar characteristics. By a careful oxidation of this material, the material is coated with a hard, completely pore-free, gloss finish and tough adhering oxide layer. The component thus produced combines all of the favorable mechanical and thermal properties of a metal with those of a highly pure electrically nonconductive ceramic material. It is particularly well suited as a surface material in gas chromatographs since in addition to having the desired resistance to mechanical, thermal and chemical influences it does not disturb or interfere with the gas chromatographic separation and does not exhibit catalytic effects.

Figure 2:
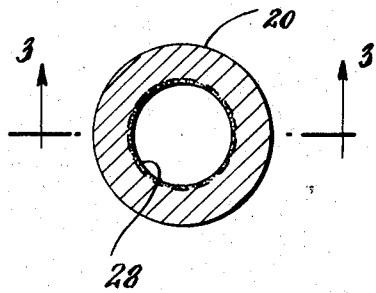
FIG. 2 is an enlarged diagram of the separating column members and fitting members utilized in the chromatograph of FIG. 1.
Figure 3:
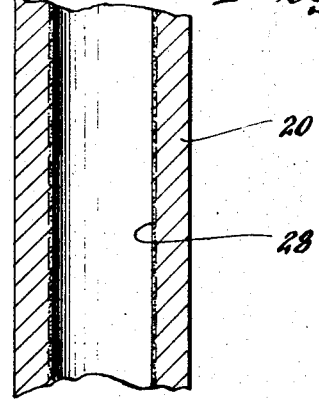
FIG. 3 is a cross-sectional view of a separating column taken along lines 3—3 of FIG. 2.
Figure 4:
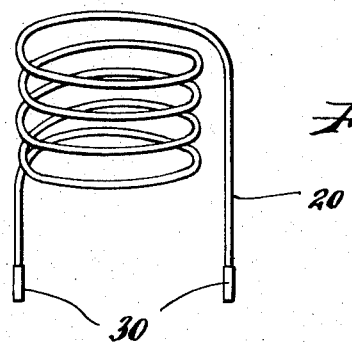
FIG. 4 is a view taken along lines 4—4 of FIG. 3.

In FIGS. 2, 3, and 4, a member comprising the column member having an oxide of zirconium surface is shown in greater detail. The column 20 is shown to be formed of zirconium and the oxide layer 28 is accentuated for convenience. This column 20 may be of the capillary type as shown in FIG. 4, in which case a separating medium is deposited on an inner wall of the column. Alternatively, it may be of the packed column type (not illustrated) in which the column is packed with a support material and the separating medium is deposited on the support material. The column of FIG. 2 is shown to have fittings 30 for coupling the column to other members of the apparatus of FIG. 1.

The oxide layer 28 can be formed not only with pure zirconium but also with alloys of zirconium. A preparation of such a surface can be accomplished in the following manner. Upon fabrication of the component of the system from zirconium or an alloy thereof, the component is carefully cleansed by degreasing and etching. Etching is accomplished by a hydrofluoric acid/nitric acid mixture—45% $HNO_3$ concentration+5% $H_2F_2$ concentration+45% $H_2O$ at approximately 86° F. This is a mixture which is well suited for zirconium alloys. An etching of approximately 10 seconds will produce uniform metallic gloss surfaces. Rinsing should immediately follow the etching without delay since, otherwise, a spotty surface which is not well suited for subsequent oxidation preparation may exist. As a rinsing medium aqua destillata is used. The oxidation preparation will yield a black gloss surface on a previously silvery white metal.

The components are maintained, by means of a suitable temperature control furnace, in an atmosphere of $H_2O$ vapor or $CO_2$ at a maximum temperature of 842° F. for about 200 hours. The pressure is not critical. The quality of the layer will be improved in accordance with the uniformity at which oxidation takes place. A wild or fast oxidation in air is therefore not advisable. A moistened $CO_2$ atmosphere is well suited. $CO_2$ is passed through a moistening plant prior to entering into the furnace chamber. Preoxidation of the components may readily be accomplished in a gas chromatographic apparatus at upper limit temperatures by passing moistened $CO_2$ through the apparatus instead of the carrier gas. Subsequent to this preparation, the components may be cleansed with customary cleansers such as chromic sulfuric acid conc., $HNO_3$, etc. from cracking residues.

The resulting surface formed on the components is pore-free, smooth, black brilliant, hard, tough layer of extreme chemical conductivity. This layer resists scraping or even hammer beating. It can be ground only with a diamond powder or the like.

While I have illustrated and described a particular embodiment of my invention, it will be understood that various modifications may be made therein without departing from the spirit of the invention and the scope of the appended claims.

What is claimed is:

1. In an analysis instrument in which a sample is to be analyzed and wherein the material from which members of the instrument are fabricated cause undesired reactions in the analysis,
    detection means for providing a quantitative or qualitative detection of said sample, and
    means including a plurality of members having inner surfaces defining a flow path for conducting a sample to said detection means and wherein at least one of said members is formed of zirconium or a zirconium alloy and a surface thereof is formed of an oxide of said zirconium or a zirconium alloy for enhancing the inert characteristics of said member.

2. An elution chromatographic instrument wherein the material from which members of the instrument are fabricated cause undesired reactions in the analysis comprising:
    a source of mobile phase including a carrier fluid for transporting a sample through the instrument,
    means for providing a sample component separating stationary phase including a substance exhibiting differing affinities for different components of the sample,
    detection means, and
    means defining a flow path for conducting said mobile phase over said stationary phase and for conducting separated sample components to the detector means, said flow path means including a plurality of members having inner surfaces thereof defining the flow path for the mobile phase and wherein at least one of said members is formed of zirconium or a zirconium alloy and a surface thereof is formed of an oxide of said zirconium or zirconium alloy for enhancing the inert characteristics of said member.

3. The instrument of claim 2 wherein said flow path means includes a separating column member and an inner surface of said column member is formed of an oxide of zirconium or zirconium alloy.

4. A chromatographic column for the separation of the components of mixtures by stationary phase-moving phase elution chromatography comprising a tube adapted to be connected in a chromatographic system and containing a separating material, said tube having an inner surface formed of an oxide of zirconium or an oxide of a zirconium alloy for increasing the inertness of the tube.

References Cited

UNITED STATES PATENTS 2,920,478  6/1957  Golay _____ 73—23.1

OTHER REFERENCES

"Surface Modification of Capillary Columns for use in Gas Chromatography," by Zlatkis and Walker. Anal. Chem., vol. 35, Sept. 10, 1963, at pp. 1359–1362.

Blumenthal, W., The Chemical Behavior of Zirconium, D. Van Nostrand Co., Inc., Princeton, N.J., 1958, pp. 28, 29, 30, 31, 163, 166 to 173.

RICHARD C. QUEISSER, Primary Examiner

C. E. SNEE III, Assistant Examiner

U.S. Cl. X.R.

55—386